(No Model.)  3 Sheets—Sheet 1.

A. BOURLIER.
ADVERTISING CABINET.

No. 525,185. Patented Aug. 28, 1894.

WITNESSES:

INVENTOR
Alphonse Bourlier
BY F. H. Gibbs
ATTORNEY.

(No Model.) 3 Sheets—Sheet 2.
A. BOURLIER.
ADVERTISING CABINET.
No. 525,185. Patented Aug. 28, 1894.
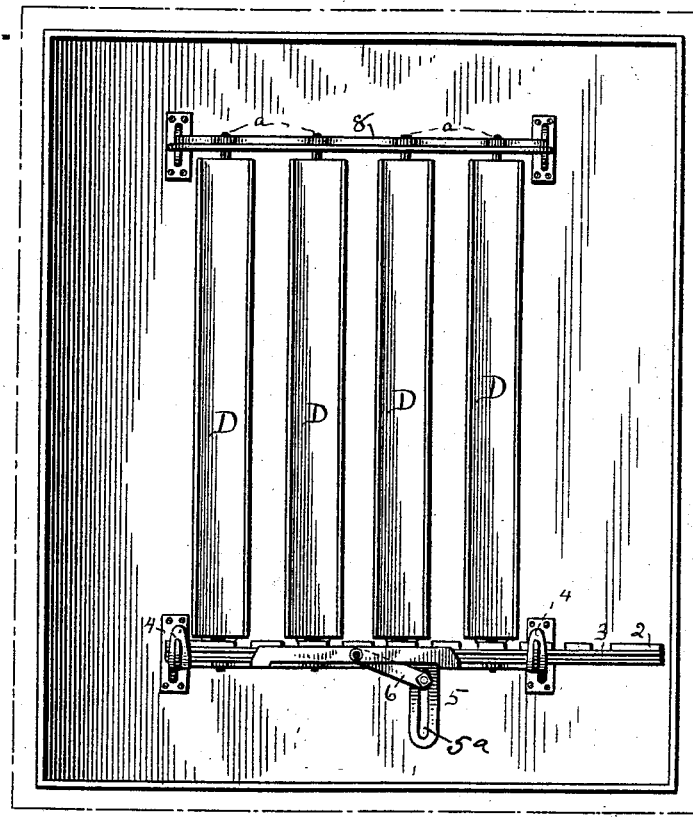
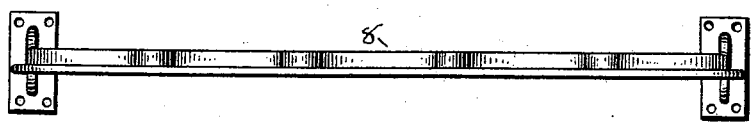
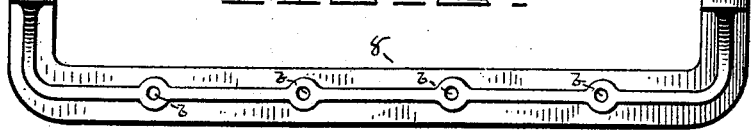
WITNESSES:
H. D. Nealy
Wm E Hurd
INVENTOR
Alphonse Bourlier
BY J. H. Gibbs
ATTORNEY.

(No Model.) 3 Sheets—Sheet 3.

A. BOURLIER.
ADVERTISING CABINET.

No. 525,185. Patented Aug. 28, 1894.

WITNESSES:
H. D. Nealy.
Wm E. Hurd.

INVENTOR
Alphonse Bourlier
BY J. H. Gibbs.
ATTORNEY.

UNITED STATES PATENT OFFICE.

ALPHONSE BOURLIER, OF LOUISVILLE, KENTUCKY.

ADVERTISING-CABINET.

SPECIFICATION forming part of Letters Patent No. 525,185, dated August 28, 1894.

Application filed December 16, 1893. Serial No. 493,884. (No model.)

*To all whom it may concern:*

Be it known that I, ALPHONSE BOURLIER, of Louisville, in the county of Jefferson and State of Kentucky, have invented new and useful Improvements in Advertising-Cabinets, of which the following, taken in connection with the accompanying drawings, is a full, clear, and exact description.

This invention relates to new and useful improvements in advertising cabinets and consists in certain peculiarities of construction and arrangement of parts, all as hereinafter more particularly set forth and specifically pointed out in the claim.

In the annexed drawings similar letters and numerals of reference denote corresponding parts in all the views, in which—

Figure 1:
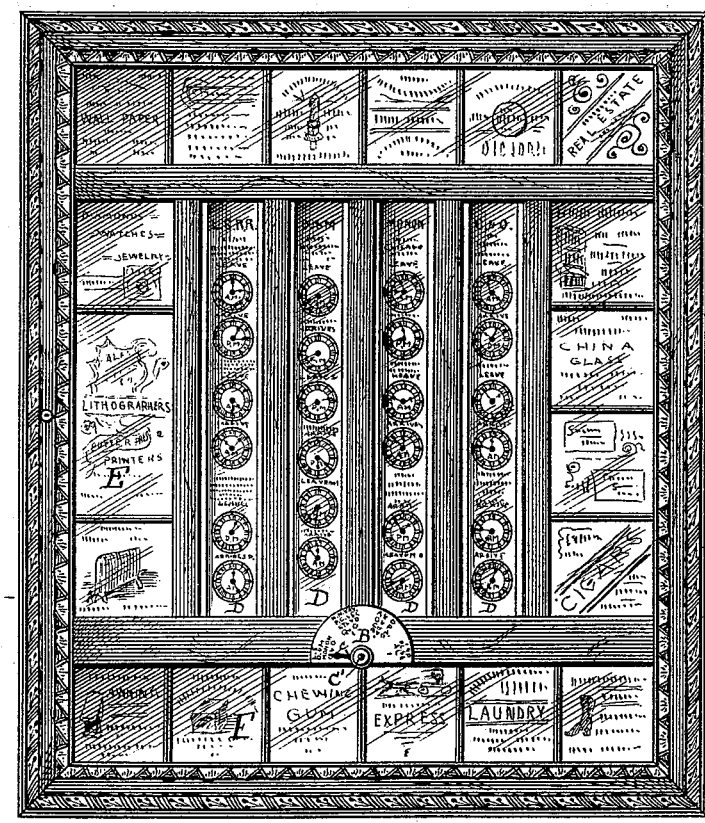
Figure 2:
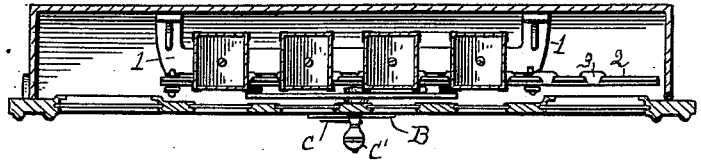
Figure 6:
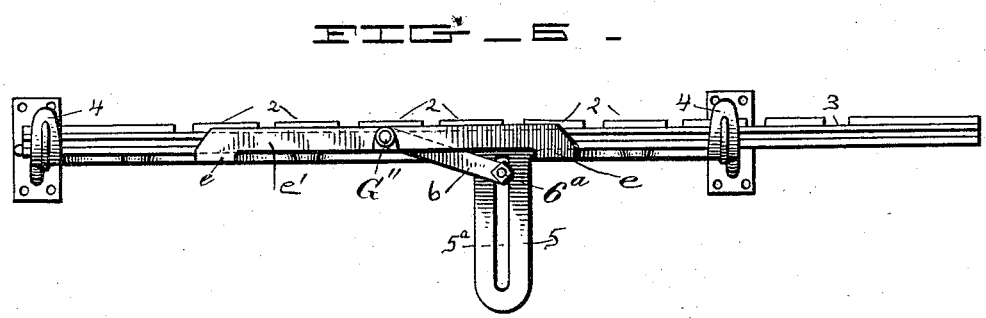
Figure 7:
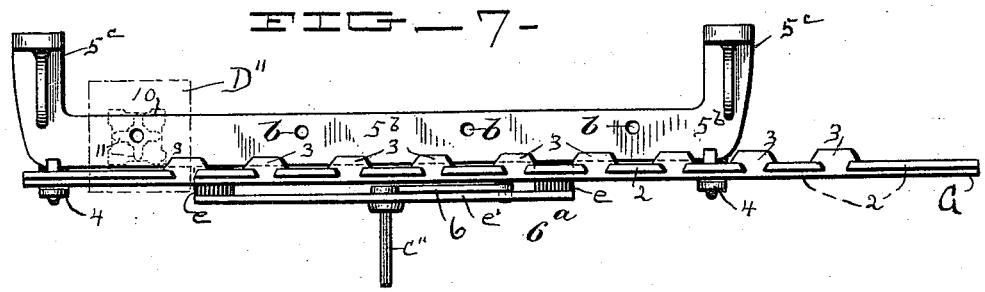
Figure 8:
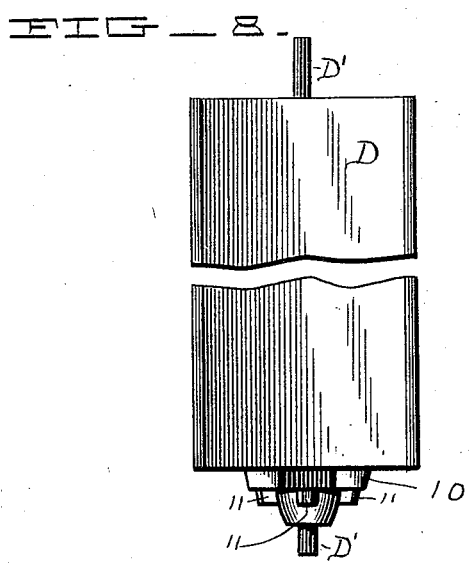
Figure 9:
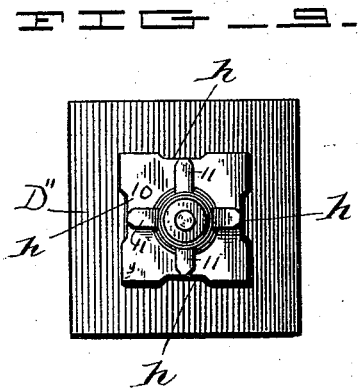

Figure 1 is a face view or front-elevation of my improved cabinet, showing the same closed and filled with railroad time tables and advertising matter of a general nature. Fig. 2 is a front elevation of the interior of the cabinet showing the general location and arrangement of operative parts. Fig. 3 is a cross section of Fig. 1 taken on line —X—X— thereof. Fig. 4 is a face view of the upper supporting bracket 8 in which columns —D— are journaled. Fig. 5 is a plan view of said bracket 8. Fig. 6 is a face view of the lower supporting bracket $5^b$— in which said columns —D— revolve. Fig. 7 is a top plan view of the parts shown in Fig. 6. Fig. 8 is an enlarged broken elevation of one of the columns —D— shown in Fig. 2, and Fig. 9 is an inverted view of one of said columns.

The general plan of the invention is to provide some convenient means for readily exhibiting railroad time tables or similar matter of general requirement, at the same time provide a cabinet in which may be placed advertising matter and to that end the operative parts are placed in a convenient frame or case which is provided with a sufficient number of ports or openings through which the columns containing the required information may be seen and inspected, and at the same time provide ready means whereby the columns may be revolved to bring their different faces into coincidence with the openings in the cabinet. The columns —D— are provided with a central axis D' upon which they may be revolved, the axis being held in the openings —b— in the top and bottom brackets 8 and $5^b$—.

The top bracket 8 consists merely of a plain bracket projecting from the rear wall of the box or case and provided with the openings —b— corresponding in number to the number of columns to be contained in the case. The lower bracket consists of the part $5^b$— with the rearward extensions $5^c$— whereby the said lower bracket is secured to the rear wall of the case to support it at the proper elevation. This bracket $5^b$— also has forward projections —e—e—e'; the parts e—e— being slightly depressed below the plane of the part $5^b$ and the part e' rising vertically at the forward end of said parts —e—. The bracket $5^b$ is also provided with the forwardly projecting hooks —4—4. Held in position by the parts —e—e' and 4, is a sliding piece the whole of which is designated by the reference letter —G—. Rising vertically from —G— is a broken rib 2 with intermediate spaces left vacant while rearwardly projecting from said part —G— is another broken or divided sectional rib 3 which consists of a series of laterally projecting spurs at right angles to said rib 2.

Connected with the part —G— and projecting downwardly therefrom is a slotted portion 5 provided with a longitudinal slot $5^a$. Projecting forwardly through the part e' is a short shaft or shank C'' to which the handle or knob c' is secured. Secured readily to the shank C'' is a runner 6. Projecting laterally from 6 is a bolt $6^a$ provided with a head on its rear end and a nut at the forward end so as to hold $6^a$ positively within the vertical slot $5^a$ in the downwardly projecting portion 5.

Referring to Figs. 8 and 9 it will be seen that the column —D— is provided at its lower end with the axis D' said axis being adapted to be held in one of the openings b in the bracket $5^b$. A base piece 10 is secured to the bottom of the column D and spurs 11 project radially from the central portion of said base 10 to the outer extremity thereof at the cutaway portions —h. Fig. 7 is a top plan view of the lower bracket in which view is illustrated a piece of one of the columns —D. When the sliding piece —G— is thrown to the extreme right it will be noted that the spur 3 is in such position with relation to said bottom portion D' that a slight movement of said sliding piece —G— toward the left will bring said spur 3 into contact with one of the spurs 11 and cause partial revolution of the column upon its axis. A continued movement toward the left will cause the corner —g— to enter the openings 3 of said piece —G— and thereby assist the revolution of the column D. When the said complete revolution is accomplished the columns can revolve no farther in the same direction so that it will be apparent that in order to bring any particular face of the columns into coincidence with the openings in the outer case, it will be necessary to reverse the direction of movement of said sliding piece —G—. By means of the peculiar formation and location of the ribs 2 and spurs 3 in their relation to the base 10 and the spurs 11 it will be apparent that longitudinal shifting of the piece —G— must necessarily cause revolution of the columns —D—, at the same time will prevent excessive revolution thereof, owing to the positive engagement of the operated parts so that the said columns are at all times under the control of the operator through the manipulation of the handle C' in moving the indicator —c— over the face of the dial —B—.

The operation of my improved device is as follows: The brackets 8 and $5^b$ are secured within the case —A—; the columns —D— are placed in the proper position in the openings —b— in said brackets and the face piece containing the advertising card shown in Fig. 1 is closed as shown in said figure and the handle C' with the dial —B— placed upon the shaft —C''—. The railroad time tables are presumed to have been arranged in such manner upon the face of the columns —D— that they will be held to said column upon their faces and in such position that the indicator —c— will register with the corresponding time tables on the dial. When a given set of time tables are brought to the front in coincidence with the vertical openings in the case so that if it is desired to secure knowledge of the arrival and departure of trains upon any given railroad, the indicator —c— is turned by means of the handle —C' to the portion of the dial —B— containing the name of the railroad desired whereupon the columns will be revolved by the turning of the handle —C' so that when the indicator —c— registers with the desired railroad on the dial the corresponding faces of the columns will be brought to the front in coincidence with the vertical openings in the case. As this class of cabinet is intended to be placed in public buildings and other positions where the public may have access to them, it is essential that precautionary measures be adopted to prevent excessive revolution of the columns and to keep the indicator —c— and the dial —B— always in proper position with relation to each other, so that the columns will always register with the corresponding names upon the dial —B—.

In devices heretofore in use it has been the practice to connect the base of the columns —D— with gearing shifting longitudinally so as to revolve said columns upon the turning of a handle similar to the one shown, but it has also been found that such construction is subject to some objection in that excessive and continuous revolution of the columns may be accomplished by continued turning of the handle —C'— in one direction, and unless the gearing is arranged with great care it will be found that the columns will thus be thrown into such position that they will not be in coincidence with the observation ports, in cases when the indicator is turned to a given railroad on the dial, unless the movement is reversed sufficiently to return said columns to their original position.

To overcome difficulties encountered in the manufacture and placing advertising cabinets manipulated by toothed gearing, I have produced the invention herein shown and described, the construction of which is such that the spurs 3 are of sufficient number to cause complete revolution of the columns —B—, but when such revolution is accomplished no farther movement in the same direction is possible.

Another feature of the advantage possessed by my improved device is that by the peculiar arrangement of the base —10— with its spurs 11, corners —g— and cutaway portions —h— in their relation to the sliding piece —G— provided with ribs 2 and spurs 3 is such that when the column —D— is brought into position that its forward base is on a line parallel with the front and rear of the box or cabinet where it is held at rest for an instant, stopping always for a brief space of time in such position, even though the handle —C'— is continuously revolved on its axis, thereby giving the observer an opportunity to read the names at the head of the column —D— so as to see if the railroad time table which he may be in search of has been brought to the front without inspecting the dial to see if the indicator is in coincidence with the name of said railroad.

Another great feature of advantage possessed by the construction shown is that the parts may be cast ready for use, and may be assembled by any mechanic without the aid of an expert thereby enabling the manufacturer to ship the parts from the factory to be assembled at the point where the cabinet is to be placed.

Having thus fully described my invention, what I claim, and desire to secure by Letters Patent, is—

In an advertising cabinet, the combination, with the frame, of a series of revoluble columns mounted therein, each column being provided with a number of faces for carrying advertising matter, and the operative portion of each column being provided with spurs of like number with the faces, and a longitudinally moving rack-bar, engaging said spurs, the distances between the successive spurs of the rack bar being greater than is necessary for continuous engagement with the spurs of the columns, whereby, upon continuous movement of the rack-bar, the columns are rotated discontinuously, that is, with periods of rest intervening between each movement, substantially as described.

In testimony whereof I have hereunto signed my name, in the presence of two attesting witnesses, at Louisville, in the county of Jefferson, in the State of Kentucky, this 19th day of August, 1893.

ALPHONSE BOURLIER.

Witnesses:
FREDERICK H. GIBBS,
JOSEPH H. LEVY.